United States Patent
Chen et al.

(10) Patent No.: US 9,904,003 B2
(45) Date of Patent: Feb. 27, 2018

(54) BACKLIGHT MODULE

(71) Applicant: Shenzhen China Star Optoelectronics Technology Co., Ltd., Shenzhen, Guangdong (CN)

(72) Inventors: Weifeng Chen, Guangdong (CN); Yicheng Kuo, Guangdong (CN); Yajun Yu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/380,068

(22) Filed: Dec. 15, 2016

(65) Prior Publication Data
US 2017/0097463 A1   Apr. 6, 2017

Related U.S. Application Data

(62) Division of application No. 14/356,366, filed on May 5, 2014, now Pat. No. 9,523,812.

(30) Foreign Application Priority Data

Feb. 25, 2014   (CN) .......................... 2014 1 0065634

(51) Int. Cl.
   *F21V 7/04*    (2006.01)
   *F21V 8/00*    (2006.01)

(52) U.S. Cl.
   CPC .......... *G02B 6/0088* (2013.01); *G02B 6/009* (2013.01); *G02B 6/0023* (2013.01); *G02B 6/0085* (2013.01)

(58) Field of Classification Search
   CPC .. G02B 6/0088; G02B 6/0023; G02B 6/0085; G02B 6/009
   See application file for complete search history.

(56) References Cited

U.S. PATENT DOCUMENTS

| | | | |
|---|---|---|---|
| 9,110,204 B2 * | 8/2015 | Nakamura | ........... G02B 6/0026 |
| 9,201,266 B2 * | 12/2015 | Hur | ................... G02F 1/133603 |
| 2015/0103291 A1 * | 4/2015 | Li | ........................ G02B 6/0023 349/62 |

\* cited by examiner

*Primary Examiner* — Ali Alavi
(74) *Attorney, Agent, or Firm* — Andrew C. Cheng

(57) ABSTRACT

A backlight module includes a backplane, a light guide plate arranged in the backplane, a backlight source arranged in the backplane and located at one side of the light guide plate, a quantum dot rail arranged between the backlight source and the light guide plate, and a retention rack that is fixedly mounted to the backplane to receive and retain a first side of the quantum dot rail. The retention rack includes a trough section in the form of a concave recess receiving and retaining the first side of quantum dot rail therein. The quantum dot rail has a second side that is opposite to the first side and a reflection sheet is attached to the second side of the quantum dot rail such that the reflection sheet is opposite to the trough section of the retention rack mounted to the backplane.

20 Claims, 5 Drawing Sheets

US 9,904,003 B2

BACKLIGHT MODULE

CROSS REFERENCE TO RELATED APPLICATIONS

This application is a divisional application of U.S. patent application Ser. No. 14/356,366, filed on May 5, 2014.

BACKGROUND OF THE INVENTION

1. Field of the Invention

The present invention relates to the field of flat panel displaying, and in particular to a backlight module.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module to generate images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

With the development of the human society, the general consumers have increasingly high requirements for the quality of the image displayed by a liquid crystal display. For the purpose of improving color saturation of an image, improvement can be made on the chromaticity of the light bard of the backlight unit in order to enhance the image color saturation. A known solution is to install a quantum dot rail in the backlight module.

Referring to FIGS. 1 and 2, of which FIG. 1 is a schematic view illustrating the structure of a quantum dot rail and FIG. 2 is a cross-sectional view of the structure of the quantum dot rail, a quantum dot rail comprises an effective zone 100 and a glass-package enclosure 300. The quantum dot rail has a cross-section that is oval in shape. Consequently, the quantum dot rail may get readily rotating during assembling and transportation of backlight modules, leading to abnormalities of lighting effect. Further, since the quantum dot rail is packaged with glass, it may readily break. Consequently, in designs of the module structures, a quantum dot rail retention rack must be provided, which is a must for holding the quantum dot rail in position, preventing the quantum dot rail from deflection and bending, and achieving thermal isolation and protection of the quantum dot rail.

SUMMARY OF THE INVENTION

An object of the present invention is to provide a backlight module that has a simple structure and a low cost and is capable of increasing color saturation.

To achieve the above object, the present invention provides a backlight module, which comprises: a backplane, a light guide plate arranged in the backplane, a backlight source arranged in the backplane and located at one side of the light guide plate, a quantum dot rail arranged between the backlight source and the light guide plate, and a retention rack that retains the quantum dot rail. The retention rack is fixedly mounted to the backplane. The retention rack comprises a trough section formed thereon to correspond to the quantum dot rail. One side of the quantum dot rail is mounted in the trough section through adhesion.

The quantum dot rail has an opposite side on which a reflection sheet is mounted.

The quantum dot rail has one side that is bonded in the trough section by a piece of doubled-sided adhesive tape.

The backplane comprises a bottom plate and a side plate connected to the bottom plate. The bottom plate and the side plate collectively delimit a receiving space, whereby the light guide plate, the backlight source, the quantum dot rail, and the retention rack are received in the receiving space.

The retention rack is fixedly mounted to the bottom plate of the backplane.

The retention rack is fixedly mounted to the bottom plate of the backplane by being fastened with screws.

The backlight module further comprises a bottom reflector plate arranged between the bottom plate of the backplane and the light guide plate, an optic film assembly arranged above the light guide plate, and a mold frame mounted on the backplane.

The mold frame comprises a holder section formed thereon to correspond to the quantum dot rail. The holder section comprises an opening formed therein. The opposite side of the quantum dot rail is received and supported in the opening.

A cushion section is arranged between the mold frame and the quantum dot rail. The opposite side of the quantum dot rail is positioned against and supported by the cushion section.

The backlight source is mounted to the side plate and a heat dissipation plate is interposed between the backlight source and the side plate.

The present invention also provides a backlight module, which comprises: a backplane, a light guide plate arranged in the backplane, a backlight source arranged in the backplane and located at one side of the light guide plate, a quantum dot rail arranged between the backlight source and the light guide plate, and a retention rack that retains the quantum dot rail, the retention rack being fixedly mounted to the backplane, the retention rack comprising a trough section formed thereon to correspond to the quantum dot rail, one side of the quantum dot rail being mounted in the trough section through adhesion;

wherein the quantum dot rail has one side that is bonded in the trough section by a piece of doubled-sided adhesive tape;

wherein the backplane comprises a bottom plate and a side plate connected to the bottom plate, the bottom plate and the side plate collectively delimiting a receiving space, whereby the light guide plate, the backlight source, the quantum dot rail, and the retention rack are received in the receiving space;

wherein the retention rack is fixedly mounted to the bottom plate of the backplane; and wherein the retention rack is fixedly mounted to the bottom plate of the backplane by being fastened with screws.

The backlight module further comprises a bottom reflector plate arranged between the bottom plate of the backplane and the light guide plate, an optic film assembly arranged above the light guide plate, and a mold frame mounted on the backplane.

The mold frame comprises a holder section formed thereon to correspond to the quantum dot rail. The holder section comprises an opening formed therein. The opposite side of the quantum dot rail is received and supported in the opening.

A cushion section is arranged between the mold frame and the quantum dot rail. The opposite side of the quantum dot rail is positioned against and supported by the cushion section.

The backlight source is mounted to the side plate and a heat dissipation plate is interposed between the backlight source and the side plate.

The efficacy of the present invention is that the present invention provides a backlight module, which comprises a retention rack arranged therein to fixedly mount the quantum dot rail between the backlight source and the light guide plate of the backlight module so as to effectively enhance color saturation of the backlight module. The retention member has a simple structure and a low cost and can effectively protect the quantum dot rail to prevent undesired rotation and damage of the quantum dot rail caused by external forces.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
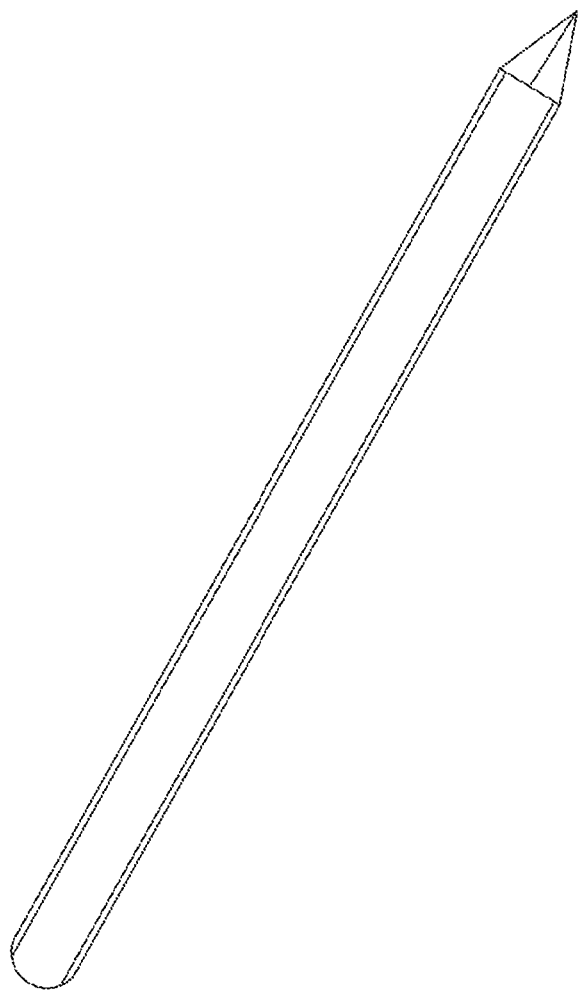
FIG. 1 is a perspective view showing the structure of a quantum dot rail.
Figure 2:
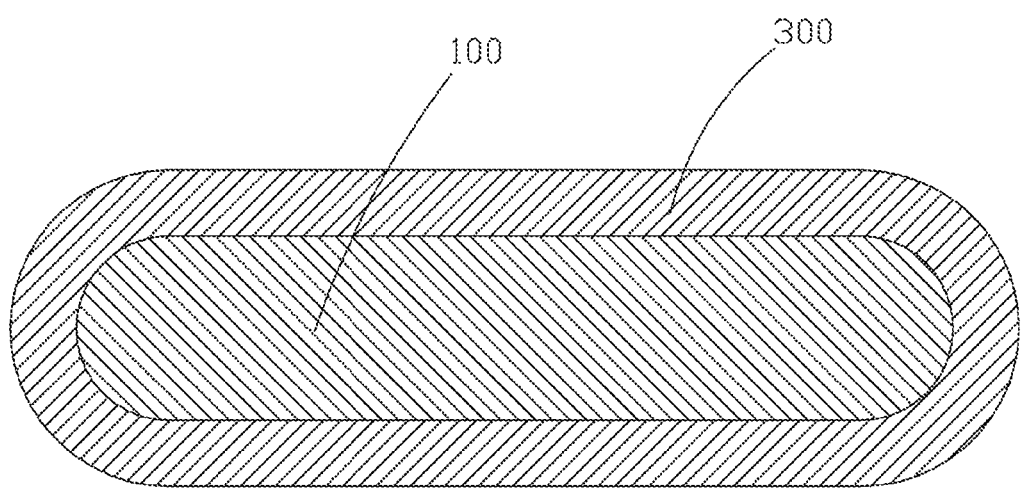
FIG. 2 is a cross-sectional view of the structure of the quantum dot rail.
Figure 3:
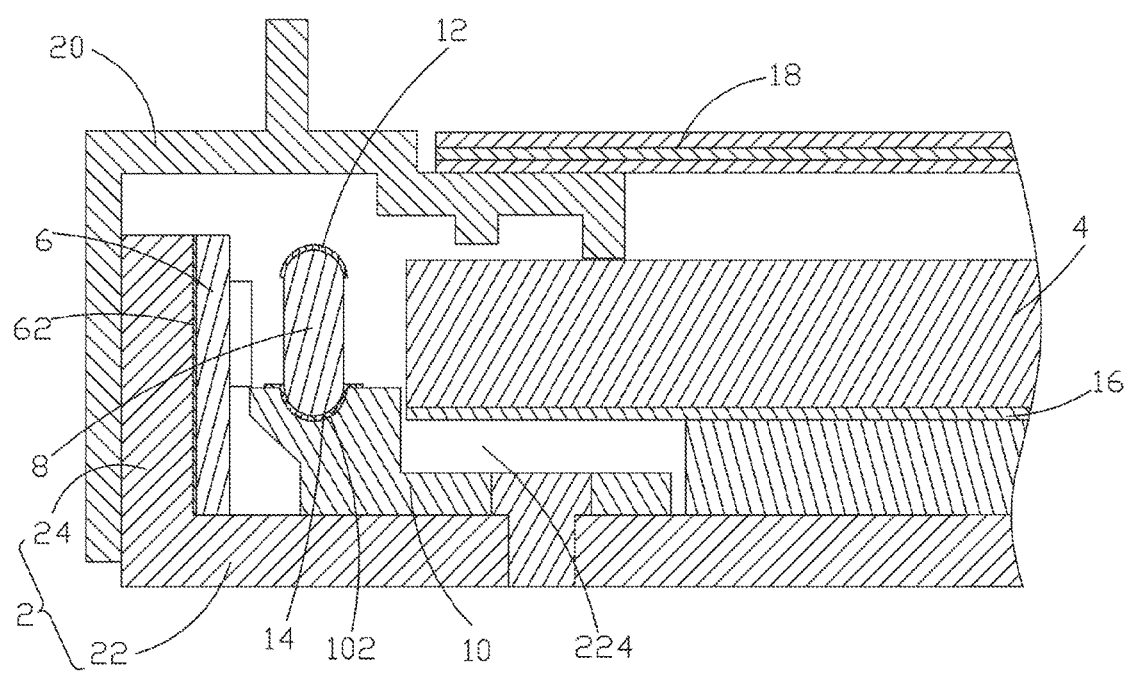
FIG. 3 is a cross-sectional view showing a backlight module according to a first embodiment of the present invention.

Referring to FIG. 3, the present invention provides a backlight module, which comprises: a backplane 2, a light guide plate 4 arranged in the backplane 2, a backlight source 6 arranged in the backplane 2 and located at one side of the light guide plate 4, a quantum dot rail 8 arranged between the backlight source 6 and the light guide plate 4, and a retention rack 10 that retains the quantum dot rail 8. The retention rack 10 is fixedly mounted to the backplane 2. The retention rack 10 has a side that corresponds to the quantum dot rail 8 and comprises a trough section 102 formed therein. One side of the quantum dot rail 8 is mounted in the trough section 102 through adhesion. With the arrangement of the retention rack 10 mounted to the backplane 2 to allow the quantum dot rail 8 to be bonded and fixed to the retention rack 10, the structure is made simple and the cost is low.

Specifically, the backplane 2 comprises a bottom plate 22 and a side plate 24 connected to the bottom plate 22. The bottom plate 22 and the side plate 24 collectively delimit a receiving space 224, whereby the light guide plate 4, the backlight source 6, the quantum dot rail 8, and the retention rack 10 are received in the receiving space 224. In the instant embodiment, the quantum dot rail 8 has a cross-section that has an oval shape and the trough section 102 is a curved trough.

The retention rack 10 is fixedly mounted to the bottom plate 22 of the backplane 2. One side of the quantum dot rail 8 is bonded in the trough section 102 by a piece of doubled-sided adhesive tape 14. In the instant embodiment, the retention rack 10 is fixedly mounted to the bottom plate 22 of the backplane 2 by being fastened with screws.

To assemble, the retention rack 10 is first mounted in the backplane 2 and then the quantum dot rail 8 is bonded to the retention rack 10; alternatively, the quantum dot rail 8 is first bonded to the retention rack 10 and then the retention rack 10 and the quantum dot rail 8 are together mounted in the backplane 2.

Further, the quantum dot rail 8 has an opposite side on which a reflection sheet 12 is mounted to prevent light from transmitting out of the opposite side of the quantum dot rail 8 for the purposes of enhancing color saturation of the backlight module, while guaranteeing light intensity of the backlight module.

It is noted that the backlight module of the present invention may further comprise a bottom reflector plate 16 arranged between the bottom plate 22 of the backplane 2 and the light guide plate 4, an optic film assembly 18 arranged above the light guide plate 4, and a mold frame 20 mounted on the backplane 2. The backlight source 6 is mounted to the side plate 24 and a heat dissipation plate 62 is interposed between the backlight source 6 and the side plate 24.

Figure 4:
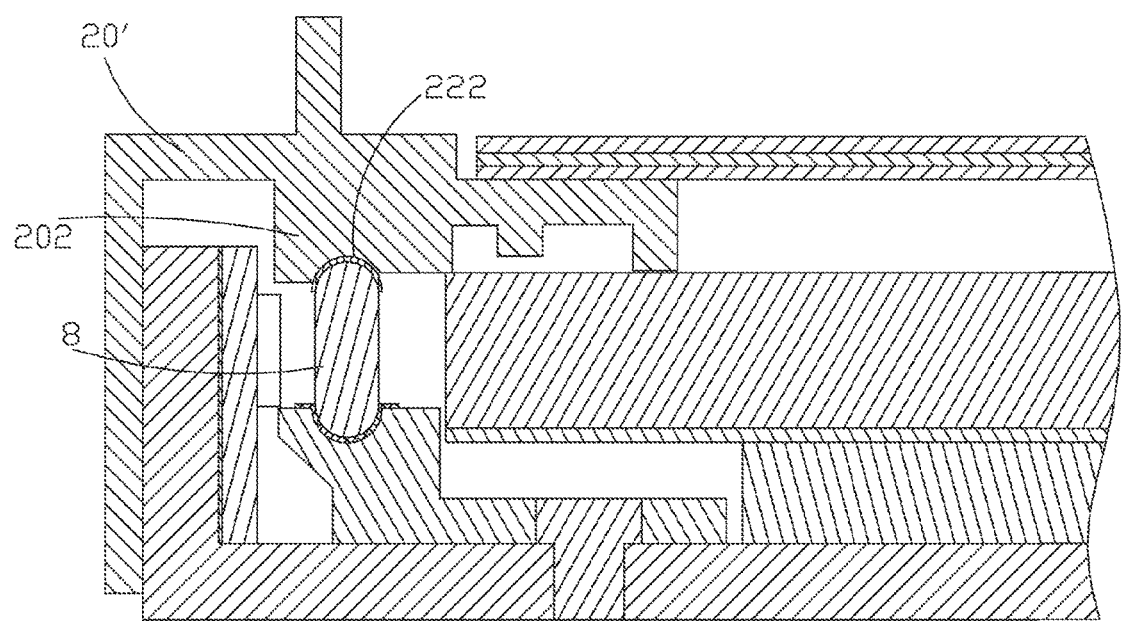
FIG. 4 is a cross-sectional view showing a backlight module according to a second embodiment of the present invention.

Referring to FIG. 4, which is a cross-sectional view of a backlight module according to a second embodiment of the present invention, in the instant embodiment, the mold frame 20' comprises a holder section 202 formed thereon to correspond to the quantum dot rail 8. The holder section 202 comprises an opening 222 formed therein. The opposite side of the quantum dot rail 8 is received and supported in the opening 222. With the arrangement of the holder section 202 in the mold frame 20', the quantum dot rail 8 can be better positioned and fixed in order to prevent the quantum dot rail from being rotated and damaged resulting from an external force thereby effectively enhancing the quality of the backlight module.

Figure 5:
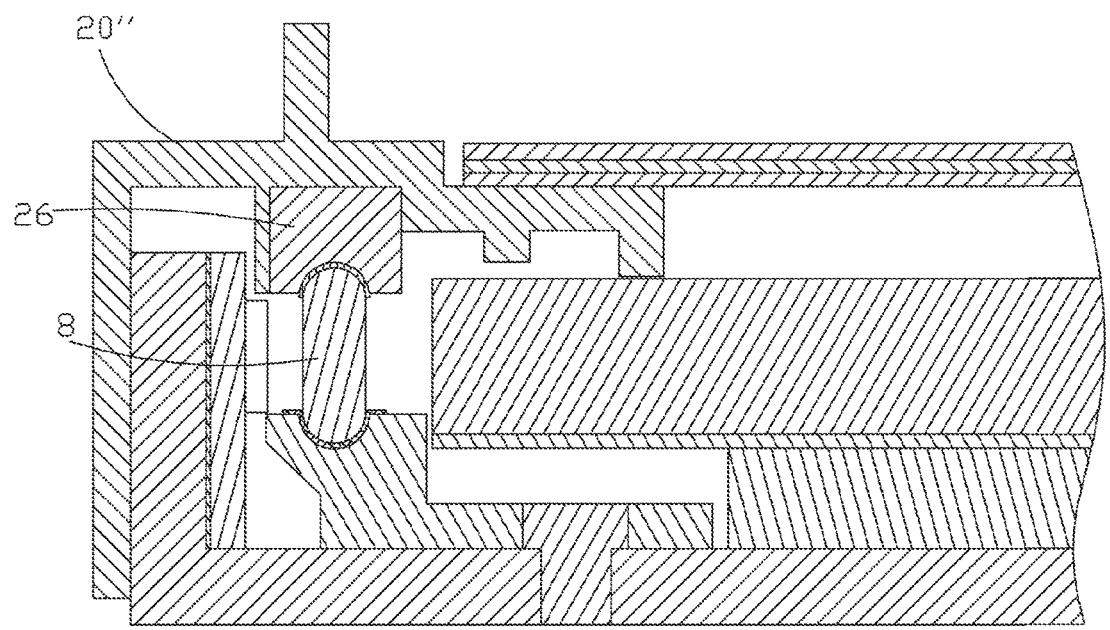
FIG. 5 is a cross-sectional view showing a backlight module according to a first embodiment of the present invention.

Referring to FIG. 5, which is a cross-sectional view of a backlight module according to a third embodiment of the present invention, in the instant embodiment, a cushion section 26 is arranged between the mold frame 20" and the quantum dot rail 8 so that the opposite side of the quantum dot rail 8 is positioned against and supported by the cushion section 26. With the arrangement of the cushion section 26, the quantum dot rail 8 is cushionably supported to prevent the quantum dot rail from being rotated and damaged resulting from an external force thereby effectively enhancing the quality of the backlight module.

In summary, the present invention provides a backlight module, which comprises a retention rack arranged therein to fixedly mount the quantum dot rail between the backlight source and the light guide plate of the backlight module so as to effectively enhance color saturation of the backlight module. The retention member has a simple structure and a low cost and can effectively protect the quantum dot rail to prevent undesired rotation and damage of the quantum dot rail caused by external forces.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising:
   a backplane defining an interior space;
   a light guide plate arranged in the interior space of the backplane;
   a backlight source arranged in the interior space of the backplane and located at one side of the light guide plate;
   a quantum dot rail arranged in the interior space of the backplane and located between the backlight source and the light guide plate; and
   a retention rack mounted to and located inside the backplane, the retention rack having an end having a part that is recessed in a concave form to define a trough section comprising a concave recess;
   wherein the quantum dot rail has a first side corresponding to and received and fixed in the concave recess of the retention rack so as to be located in the interior space of the backplane; and
   wherein the quantum dot rail has a second side that is opposite to the first side and a reflection sheet is attached to the second side of the quantum dot rail to be opposite to the concave recess.

2. The backlight module as claimed in claim 1, wherein the first side of the quantum dot rail is fixed in the trough section by a piece of doubled-sided adhesive tape that is arranged between the first side of the quantum dot rail and the concave recess of the trough section of the retention rack.

3. The backlight module as claimed in claim 1, wherein the backplane comprises a bottom plate and a side plate connected to the bottom plate, the bottom plate and the side plate collectively delimiting the interior space of the backplane, in which the light guide plate, the backlight source, the quantum dot rail, and the retention rack are received.

4. The backlight module as claimed in claim 3, wherein the retention rack is fixedly mounted to the bottom plate of the backplane.

5. The backlight module as claimed in claim 3, wherein the retention rack is fixedly mounted to the bottom plate of the backplane by being fastened with screws.

6. The backlight module as claimed in claim 1, wherein the light guide plate has a bottom surface and an opposite top surface and the bottom surface is provided with a bottom reflector attached to the bottom surface of the light guide plate.

7. The backlight module as claimed in claim 1, wherein the light guide plate has a bottom surface and an opposite top surface and an optic film assembly is arranged above the top surface of the light guide plate and is supported on a mold frame that is mounted on the backplane.

8. The backlight module as claimed in claim 3, wherein the light guide plate has a bottom surface and an opposite top surface and the bottom surface is provided with a bottom reflector that is arranged between the bottom plate of the backplane and the bottom surface of the light guide plate.

9. The backlight module as claimed in claim 7, wherein the mold frame comprises a holder section formed thereon to correspond to the quantum dot rail, the holder section comprising an opening formed therein to correspond to and receive and hold the second side of the quantum dot rail therein so as to retain the quantum dot rail between the holder section of the mold frame and the retention rack of the backplane.

10. The backlight module as claimed in claim 7, wherein a cushion section is arranged between the mold frame and the quantum dot rail to engage and hold the second side of the quantum dot rail so as to retain the quantum dot rail between the cushion section that is mounted to the mold frame and the retention rack of the backplane.

11. The backlight module as claimed in claim 3, wherein the backlight source is mounted to the side plate of the backplane and a heat dissipation plate is interposed between the backlight source and the side plate.

12. A backlight module, comprising:
   a backplane defining an interior space;
   a light guide plate arranged in the interior space of the backplane;
   a backlight source arranged in the interior space of the backplane and located at one side of the light guide plate;
   a quantum dot rail arranged in the interior space of the backplane and located between the backlight source and the light guide plate; and
   a retention rack mounted to and located inside the backplane, the retention rack having an end having a part that is recessed in a concave form to define a trough section comprising a concave recess;
   wherein the quantum dot rail has a first side corresponding to and received and fixed in the concave recess of the retention rack so as to be located in the interior space of the backplane;
   wherein the quantum dot rail has a second side that is opposite to the first side and a reflection sheet is attached to the second side of the quantum dot rail to be opposite to the concave recess;
   wherein the first side of the quantum dot rail is fixed in the trough section by a piece of doubled-sided adhesive tape that is arranged between the first side of the quantum dot rail and the concave recess of the trough section of the retention rack;

wherein the backplane comprises a bottom plate and a side plate connected to the bottom plate, the bottom plate and the side plate collectively delimiting the interior space of the backplane, in which the light guide plate, the backlight source, the quantum dot rail, and the retention rack are received; and wherein the retention rack is fixedly mounted to the bottom plate of the backplane by being fastened with screws.

13. The backlight module as claimed in claim 12, wherein the light guide plate has a bottom surface and an opposite top surface and the bottom surface is provided with a bottom reflector attached to the bottom surface of the light guide plate.

14. The backlight module as claimed in claim 12, wherein the light guide plate has a bottom surface and an opposite top surface and an optic film assembly is arranged above the top surface of the light guide plate and is supported on a mold frame that is mounted on the backplane.

15. The backlight module as claimed in claim 12, wherein the light guide plate has a bottom surface and an opposite top surface and the bottom surface is provided with a bottom reflector that is arranged between the bottom plate of the backplane and the bottom surface of the light guide plate.

16. The backlight module as claimed in claim 14, wherein the mold frame comprises a holder section formed thereon to correspond to the quantum dot rail, the holder section comprising an opening formed therein to correspond to and receive and hold the second side of the quantum dot rail therein so as to retain the quantum dot rail between the holder section of the mold frame and the retention rack of the backplane.

17. The backlight module as claimed in claim 14, wherein a cushion section is arranged between the mold frame and the quantum dot rail to engage and hold the second side of the quantum dot rail so as to retain the quantum dot rail between the cushion section that is mounted to the mold frame and the retention rack of the backplane.

18. The backlight module as claimed in claim 12, wherein the backlight source is mounted to the side plate of the backplane and a heat dissipation plate is interposed between the backlight source and the side plate.

19. The backlight module as claim in claim 12, wherein the quantum dot rail has a third side extending between the first and second sides of the quantum dot rail and facing the backlight source.

20. The backlight module as claimed in claim 19, wherein the quantum dot rails has a fourth side extending between the first and second sides of the quantum dot rail and opposite to the third side, the fourth side facing the light guide plate.

* * * * *